US009104337B2

(12) United States Patent
Shalev et al.

(10) Patent No.: US 9,104,337 B2
(45) Date of Patent: *Aug. 11, 2015

(54) INTERCEPTING, TRANSFORMING, AND GROUPING DATA OBJECTS FOR STORAGE

(75) Inventors: Ori Shalev, Kiryat Ono (IL); Jonathan Amit, Omer (IL)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 161 days.

This patent is subject to a terminal disclaimer.

(21) Appl. No.: 13/117,911

(22) Filed: May 27, 2011

(65) Prior Publication Data

US 2011/0231619 A1    Sep. 22, 2011

Related U.S. Application Data

(63) Continuation of application No. 12/730,297, filed on Mar. 24, 2010.

(60) Provisional application No. 61/163,267, filed on Mar. 25, 2009.

(51) Int. Cl.
G06F 12/00 (2006.01)
G06F 13/00 (2006.01)
G06F 13/28 (2006.01)
G06F 3/06 (2006.01)
G06F 11/20 (2006.01)
G06F 11/14 (2006.01)

(52) U.S. Cl.
CPC ............ *G06F 3/0659* (2013.01); *G06F 3/061* (2013.01); *G06F 3/067* (2013.01); *G06F 11/2064* (2013.01); *G06F 11/2074* (2013.01); *G06F 11/1464* (2013.01); *G06F 11/2071* (2013.01)

(58) Field of Classification Search
None
See application file for complete search history.

(56) References Cited

U.S. PATENT DOCUMENTS

| | | | |
|---|---|---|---|
| 5,592,618 A * | 1/1997 | Micka et al. | 714/54 |
| 5,903,724 A * | 5/1999 | Takamoto et al. | 709/200 |
| 7,386,692 B1 | 6/2008 | Moore et al. | |
| 2003/0135640 A1* | 7/2003 | Ho et al. | 709/237 |
| 2004/0073831 A1 | 4/2004 | Yanai et al. | |
| 2005/0102553 A1* | 5/2005 | Cochran et al. | 714/6 |
| 2005/0273654 A1* | 12/2005 | Chen et al. | 714/13 |
| 2007/0022264 A1* | 1/2007 | Bromling et al. | 711/162 |
| 2007/0050475 A1* | 3/2007 | Hughes | 709/218 |
| 2007/0186068 A1 | 8/2007 | Agrawal | |
| 2008/0183767 A1 | 7/2008 | Zhu et al. | |
| 2009/0190760 A1* | 7/2009 | Bojinov et al. | 380/269 |
| 2010/0058013 A1 | 3/2010 | Gelson et al. | |

* cited by examiner

*Primary Examiner* — Jared Rutz
*Assistant Examiner* — Marwan Ayash
(74) *Attorney, Agent, or Firm* — Griffiths & Seaton PLLC

(57) ABSTRACT

Systems capable of transformation of logical data objects for storage and methods of operating thereof are provided. One method includes identifying among a plurality of requests addressed to the storage device two or more "write" requests addressed to the same logical data object, deriving data chunks corresponding to identified "write" requests and transforming the derived data chunks, grouping the transformed data chunks in accordance with the order the requests have been received and in accordance with a predefined criteria, generating a grouped "write" request to the storage device, and providing mapping in a manner facilitating one-to-one relationship between the data in the obtained data chunks and the data to be read from the transformed logical object. The method further includes obtaining an acknowledging response from the storage device, multiplying the obtained acknowledging response, and sending respective acknowledgements to each source that initiated each respective "write" request.

18 Claims, 4 Drawing Sheets

INTERCEPTING, TRANSFORMING, AND GROUPING DATA OBJECTS FOR STORAGE

CROSS-REFERENCES TO RELATED APPLICATIONS

The present application is a continuation of U.S. patent application Ser. No. 12/730,297, filed on Mar. 24, 2010, which claims priority to U.S. Provisional Patent Application No. 61/163,267, filed on Mar. 25, 2009, each application is incorporated herein by reference in their entirety.

FIELD OF THE INVENTION

This invention relates to computing systems, and, in particular, to methods and systems capable of transforming logical data objects to be stored in computing systems and networks thereof.

BACKGROUND OF THE INVENTION

With increasing demand for faster, more powerful and more efficient ways to store information, optimization of storage technologies has become a key challenge.

Logical data objects (data files, image files, data blocks, etc.) may be transformed for transmission and/or storage. The transformation may comprise compression, encryption, encoding, conversion, etc. and/or combinations thereof. For example, data compression techniques are used to reduce the amount of data to be stored or transmitted in order to reduce storage capacity and transmission time respectively. Compression may be achieved by using different compression algorithms known in the art. Data stored in plaintext is open to potential malicious use (e.g. unauthorized access, misuse, theft, etc.), and known in the art solutions for perimeter and/or access control (e.g. firewalls, Virtual Private Networks, LUN masking control and zoning in SAN storage networks, NAS security control features, etc.) still leave security vulnerabilities. Encrypting data to be stored may considerably reduce security threats; such encryption may be provided by using different algorithms known in the art.

The problems of compressing, encrypting or other transforming data for storage and access to the stored transformed data have been recognized in the Prior Art and various systems have been developed to provide a solution. For example, various solutions are disclosed in International Applications WO2007138600, WO2007138601 and WO2007138602 published Dec. 12, 2007 and assigned to the assignee of the present application. The entire contents of said International Applications are hereby incorporated by reference in their entirety.

SUMMARY OF THE INVENTION

In accordance with certain aspects of there present invention, there is provided a method of operating a transformation system. The transformation system is operatively coupled to a plurality of clients and to at least one storage device and operable to write a plurality of data chunks to a plurality of transformed logical data objects (LOs) stored in the storage device. Each given transformed LO corresponds to a respective original logical data object (LO) and is configured to sequentially accommodate a plurality of variable size data chunks corresponding to the original LO, transformed by the transformation system and accommodated in accordance with an order in which said chunks are received. The method comprises: (a) identifying among a plurality of requests addressed to the storage device two or more "write" requests addressed to the same logical data object; (b) deriving data chunks corresponding to said identified "write" requests and processing the derived data chunks, thereby giving rise to transformed data chunks; (c) grouping the transformed data chunks in accordance with the order the requests have been received, said grouping provided in accordance with a predefined criteria, thus giving rise to a group of transformed data chunks; (d) generating a grouped "write" request to the storage device for accommodating said group of transformed data chunks in the respective transformed LO whilst keeping the order the data chunks have been received; and (e) enabling mapping between the data in the original LO and the data accommodated in the transformed LO in a manner facilitating one-to-one relationship between the data in the derived data chunks and the data to be read from the transformed logical object.

In accordance with further aspects of the present invention, the method further comprises: (a) obtaining an acknowledging response from the storage device; (b) multiplying the obtained acknowledging response, and c) sending respective acknowledgements to each source which initiated at least one identified "write" request corresponding to the group of transformed data chunks.

In accordance with further aspects of the present invention, at least part of the identified "write" requests may be obtained by intercepting by the transformation system a plurality of requests addresses by one or more clients among said plurality of clients to said at least one storage device and/or may be generated by the transformation system during a maintenance and/or optimization process.

In accordance with other aspects of the present invention, there is provided a method of writing data to a transformed logical data object stored in a storage device operable with at least one storage protocol. The transformed logical data object comprising a header, an index section and one or more accommodation sections with predefined size, said sections sequentially accommodating transformed data chunks resulting from transformation of a respective logical data object. The method comprises: (a) identifying among a plurality of requests addressed to the storage device two or more "write" requests addressed to the same logical data object; (b) deriving data chunks corresponding to said identified "write" requests and processing the derived data chunks, thereby giving rise to transformed data chunks; (c) grouping the transformed data chunks in accordance with the order the requests have been received, said grouping provided in accordance with a predefined criteria, thus giving rise to a group of transformed data chunks; (d) generating a grouped "write" request to the storage device for sequentially accommodating said group of transformed data chunks in accordance with the order these and previous chunks were received; and (e) updating the index section in a manner facilitating one-to-one relationship between the data in derived data chunks and the data to be read from the transformed logical object. The operations are provided by a transformation system operatively coupled to a plurality of clients and to one or more storage device. At least part of the identified "write" requests may be obtained by intercepting by the transformation system a plurality of requests addresses by one or more clients among said plurality of clients to one or more storage devices and/or may be generated by the transformation system during a maintenance and/or optimization process.

In accordance with further aspects of the present invention, the method further comprises: (a) obtaining an acknowledging response from the storage device; (b) multiplying the obtained acknowledging response, and (c) sending respective acknowledgements to each source which initiated at least one identified "write" request corresponding to the group of transformed data chunks.

In accordance with other aspects of the present invention, there is provided a transformation system capable of transforming a logical data object for storage in a storage device, the system operatively coupled to a plurality of clients and to at least one storage device configured to accommodate data transformed by the transformation system. The system comprises: (a) means for creating in said at least one storage device a plurality of transformed logical data objects (LOs), each given transformed LO corresponding to a respective original logical data object (LO) and configured to sequentially accommodate a plurality of variable size data chunks corresponding to the original LO, transformed by the transformation system and accommodated in accordance with an order in which said chunks are received, said accommodation further comprising a mapping between the data in the original LO and the data accommodated in the transformed LO; (b) means for identifying among a plurality of requests addressed to the storage device two or more "write" requests addressed to the same logical data object; (c) means for deriving data chunks corresponding to said identified "write" requests and processing the derived data chunks, thereby giving rise to transformed data chunks; (d) means for grouping the transformed data chunks in accordance with the order the requests have been received, said grouping provided in accordance with a predefined criteria, thus giving rise to a group of transformed data chunks; (e) means for generating a grouped "write" request to the storage device for sequential accommodation of transformed data chunks in respective transformed logical object; and (f) means for enabling updating the mapping in a manner facilitating one-to-one relationship between the data in the obtained data chunks and the data to be read from the transformed logical object.

The system further comprises (a) means for obtaining an acknowledging response from the storage device; and (b) means for multiplying the obtained acknowledging response, and sending respective acknowledgements to each source which initiated at least one identified "write" request corresponding to the group of transformed data chunks.

The system further comprises means for intercepting at least part of the plurality of requests addresses by one or more clients among said plurality of clients to said at least one storage device.

In accordance with further aspects of the present invention, the system may comprise a maintenance unit operable to generate during maintenance and/or optimization process one or more "write" requests addressed to the storage device.

Among advantages of certain embodiments of the present invention is reducing the amount of input/output operations executed by the storage system and required for write operations in accordance with obtained "write" requests.

BRIEF DESCRIPTION OF THE DRAWINGS

In order to understand the invention and to see how it may be carried out in practice, embodiments will now be described, by way of non-limiting example only, with reference to the accompanying drawings, in which.

DETAILED DESCRIPTION OF THE DRAWINGS

Figure 1:
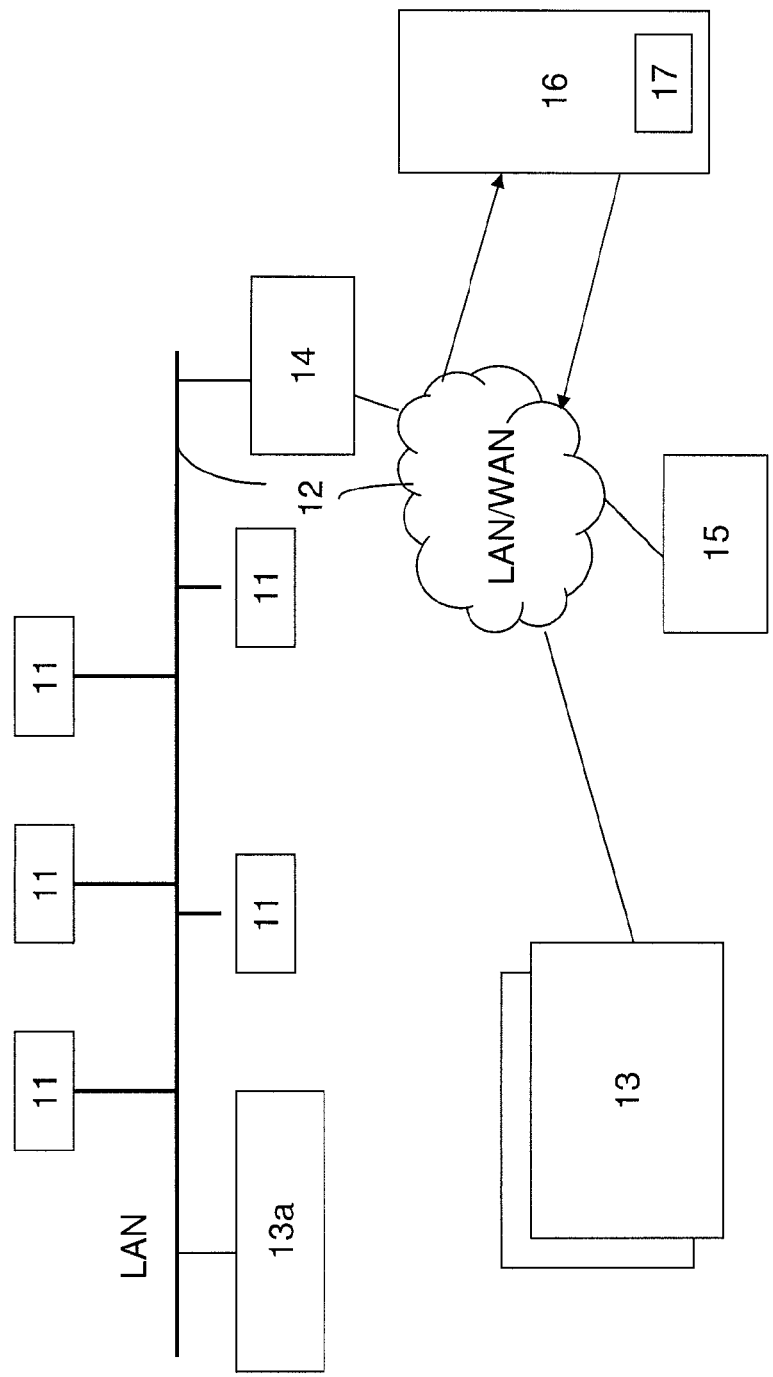
FIG. 1 illustrates a schematic block diagram of typical storage network architecture as is known in the art.

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention. In the drawings and descriptions, identical reference numerals indicate those components that are common to different embodiments or configurations.

Unless specifically stated otherwise, as apparent from the following discussions, it is appreciated that throughout the specification discussions utilizing terms such as "processing," "computing," "calculating," "determining," "generating," "writing" or the like, refer to the action and/or processes of a computer that manipulate and/or transform data into other data, said data represented as physical, such as electronic, quantities and/or said data representing the physical objects. The term "computer" should be expansively construed to cover any kind of electronic system with data processing capabilities, including, by way of non-limiting example, personal computers, servers, computing system, communication devices, storage devices, processors (e.g. digital signal processor (DSP), microcontrollers, field programmable gate array (FPGA), application specific integrated circuit (ASIC), etc.) and other electronic computing devices.

The operations in accordance with the teachings herein may be performed by a computer specially constructed for the desired purposes or by a general purpose computer specially configured for the desired purpose by a computer program stored in a computer readable storage medium.

Embodiments of the present invention are not described with reference to any particular programming language. It will be appreciated that a variety of programming languages may be used to implement the teachings of the inventions as described herein.

The references cited in the background teach many principles of transforming data for storage and operating the transformed data that are applicable to the present invention. Therefore the full contents of these publications are incorporated by reference herein for appropriate teachings of additional or alternative details, features and/or technical background.

The term "logical data object (LO)" used in this patent specification should be expansively construed to include any types and granularities of data units used in a computing system and handled as one unit (e.g. data files, archive files, image files, database files, memory data blocks, stream data blocks, predefined segments of files, etc.).

Bearing this in mind, attention is drawn to FIG. 1 illustrating a schematic diagram of storage network architecture applicable to certain embodiments of the present invention. The logical data objects (LO) from clients (workstations, application servers, etc.) 11 are transferred via a network 12 to storage device(s) 13 (e.g. specialized to NAS file servers, general purpose file servers, SAN storage, stream storage device, etc.) and/or 13a. The network comprises one or more communication devices 14 (e.g. switch, router, bridge, etc.) facilitating the data transfer. The storage in the illustrated network may be wholly or partly implemented using block mode access and/or file mode access storage protocols. In file mode access the logical data objects (LOs) are constituted by files, and the network is IP network (e.g. local area network (LAN), wide area network (WAN), combination thereof, etc.). In block mode access embodiments, the logical data objects are constituted by data blocks and the network is Storage Area Network (SAN) implementing, for example, Fiber Channel or iSCSI protocols. In certain embodiments clients may be directly connected to the storage device (13*a*) via LAN part of the network 12, e.g. via block mode access storage protocols as SCSI, Fiber Channel, etc. Such Direct Access Storage may include, for example, the internally attached local disk drives or externally attached RAID (redundant array of independent disks) or JBOD (just a bunch of disks), etc.

At least part of the logical data objects (LOs) may be stored in a transformed form (e.g. a compressed form and/or an encrypted form). The transformation or part thereof may be provided by a transformation system 16 operatively coupled to the clients and to the storage device(s) and configured to intercept LO call operations (LO access-related requests) as well as some control transactions and to act as a proxy on certain transactions. By way of non-limiting example, the transformation system may be configured to transfer such control-related requests as format disk, de-fragment disk, take a snapshot, etc. between the client and the storage device in a transparent manner, while intervening in data access-related transactions (e.g. read, write, etc.) and some control related transactions (e.g. capacity status, set end of LO, etc.)

The transformation system 16 is capable of deriving and processing data corresponding to the intercepted LO access-related request, facilitating, when appropriate, communication with and/or within the file system for storing the processed data at the storage medium as at least one transformed LO.

During creating a transformed LO and/or "write" request to the transformed LO, the transformation system 16 derives data corresponding to said LO, transforms the data and facilitates writing at the storage device 13. A "read" operation proceeds in reverse direction; the required LO or parts thereof is retrieved by the transformation system, de-transformed (partly or entirely, in accordance with required data range and implemented transformation technique) and sent to the appropriate client.

Typically the secure keys used for encryption (if required) are held separately from the device providing encryption and/or storage, for example, they may be held at a key holding platform 15 operatively coupled with the transformation system 16. Likewise, coding tables and similar external data involved in the transformation process may be held separate from the processing and/or storage devices. When appropriate, the transformation system is capable to communicate with the external platform (e.g. keys holding platform 15) for obtaining external data involved in the transformation process (e.g. secure keys and/or secure values or other metadata thereof involved in the transformation).

Non-limiting examples of the transformation system 16 are disclosed in International Applications WO2007138600, WO2007138601 and WO2007138602 published Dec. 12, 2007 and assigned to the assignee of the present application.

In certain embodiments of the invention, the transformation system 16 may comprise maintenance unit 17 responsible for various maintenance tasks such as, for example, storage space optimization.

Note that the invention is not bound by the specific architecture described with reference to FIG. 1. For purpose of illustration only, the following description is made with respect to processing by the transformation system 16 the logical data objects to be stored at the storage device, writing the processed data to the storage device 13, reading the data to be de-transformed (e.g. decrypted, decompressed, etc.) from the storage device, and de-transforming them by the transformation system 16. Those versed in the art will readily appreciate that the invention is, likewise, applicable to any purpose device adapted to implement the teachings of the present invention and operatively located on a physical and/or logical route between a client sending a data access request to the logical data object and a storage location of the appropriate data, including embodiments wherein the transformation system is integrated, fully or partly, with the communication device, workstation, application server and/or storage device.

Figure 2:
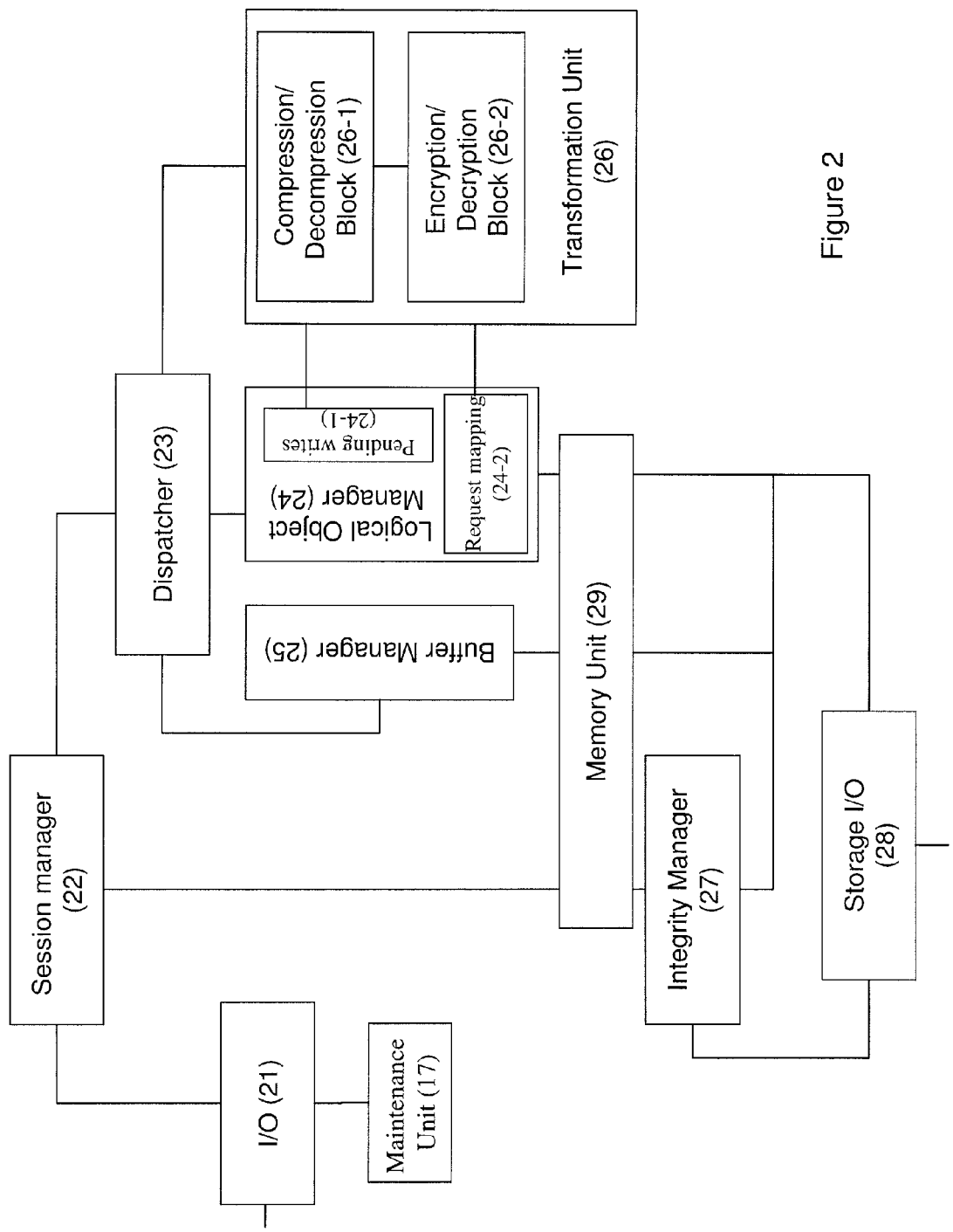
FIG. 2 illustrates a schematic functional block diagram of the transformation system in accordance with certain embodiments of the present invention.

FIG. 2 illustrates a schematic functional block diagram of the transformation system 16 in accordance with certain embodiments of the present invention. The transformation system comprises a Client Input/Output (I/O) block 21 coupled to a session manager 22. The client I/O block is operable to forward data access-related requests (e.g. read, write, set end of file/truncate, etc.) received from the clients or from the maintenance unit 17 to the session manager.

A session starts by access request to a logical data object (e.g. LUN capacity request as, for example, SCSI LUN capacity request command; open file request, etc.) and ends by disconnect request (e.g. "LUN disconnect", "close file", etc.) received from the same IP address (user) with regard to the same logical object. The session may handle one or more access requests addressed to the same logical data object (e.g. from multiple applications running on the same client, multiple requests from certain single applications, etc.).

The session manager 22 is operable to derive and/or generate session-related data (e.g. source session address, session counters, session status, relevant instances, etc.) and to hold the respective data in a memory unit 29. The session manager is further operable to handle blocking all the relevant resources when the logical data object is open and releasing said resources on disconnect. The session manager is further configured to recognize and manage a plurality of sessions addressed to the same logical data object handling one or more access requests.

The requests from one or more clients and/or requests from the maintenance unit 17 are transferred from the session manager to a dispatcher 23 operatively coupled to the session manager. The dispatcher 23 is operatively coupled to a logical data object manager 24, a buffer manager 25 and a transformation unit 26. The dispatcher 23 communicates with the logical data object manager 24 for data related transactions (e.g. Read, Write, set end of file, etc.) and with the transformation unit 26 for providing transformation operations in accordance with certain embodiments of the present invention.

The transformation unit is further operatively coupled to the memory unit 29 and operable to compress, encrypt and/or otherwise transform data, and to enable sending the transformed data to a physical disk through a storage I/O interface 28. The transformation unit is further operable to enable reading data from the physical disk through the storage I/O interface, to de-transform (e.g. decrypting and/or decompressing) the respective buffer(s) and, optionally, to segment and/or combine original and/or partly transformed data chunks during the processing. The transformation unit may comprise one or more transformation blocks responsible for certain transforming operations (e.g. compression-decompression block 26-1 operatively coupled to the encryption/decryption block 26-2), and may be configured to facilitate data transfer and necessary synchronization between the blocks.

The transformation unit 26 may be further configured to communicate with one or more external platforms storing external information related to data involved in the transformation process (e.g. the secure keys for receiving the keys and/or metadata thereof); to receive the information, extract or generate the necessary data (e.g. key ID) and to manage thereof. The received information may be temporary accommodated in a trusted memory within the transformation system, wherein the transformation unit may provide a management of the information (e.g. to manage accommodation of certain keys in the memory for certain time period in accordance with a certain policy). In certain embodiments of the invention the encryption/decryption block 26-2 may further generate one or more encryption initialization vectors to be used for encryption (e.g. together with secure keys).

The logical object manager 24 is further operatively coupled to the memory unit 29 and is operable to handle ordering and memory sharing by different logical data objects and parts thereof.

The logical object manager 24 is further operatively coupled to the memory unit 29 and comprises a pending writes unit 24-1 and a request mapping unit 24-2, both units operatively coupled to the transformation unit 26. As will be further detailed with reference to FIGS. 3-4, the logical object manager is further involved in grouping multiple access requests addressed to the same logical data object.

The pending writes unit 24-1 is operable to hold information of pending write requests. The request mapping unit 24-2 is responsible for grouping respective "write" requests and generating a grouped request to be sent to the storage I/O interface 28. The request mapping unit 24-2 is further responsible for handling a write response as will be further detailed with reference to FIG. 3.

The buffer manager 25 is operable to manage memory buffer resources and is responsible for allocating and releasing memory buffer for operations of other blocks. The transformation system further comprises an integrity manager 27 operatively coupled to the session manager, the buffer manager and the logical object manager. The integrity manager is responsible for synchronization and general control of the processes in the transformation system as, for example keeping the integrity of the logical data objects, etc. It is further responsible for flashing the memory buffer to the physical disk(s) through the storage physical I/O interface 28, and reading when needed from the disk(s).

Those skilled in the art will readily appreciate that the invention is not bound by the configuration of FIG. 2; equivalent and/or modified functionality may be consolidated or divided in another manner and may be implemented in software, firmware, hardware, or any combination thereof.

Figure 3:
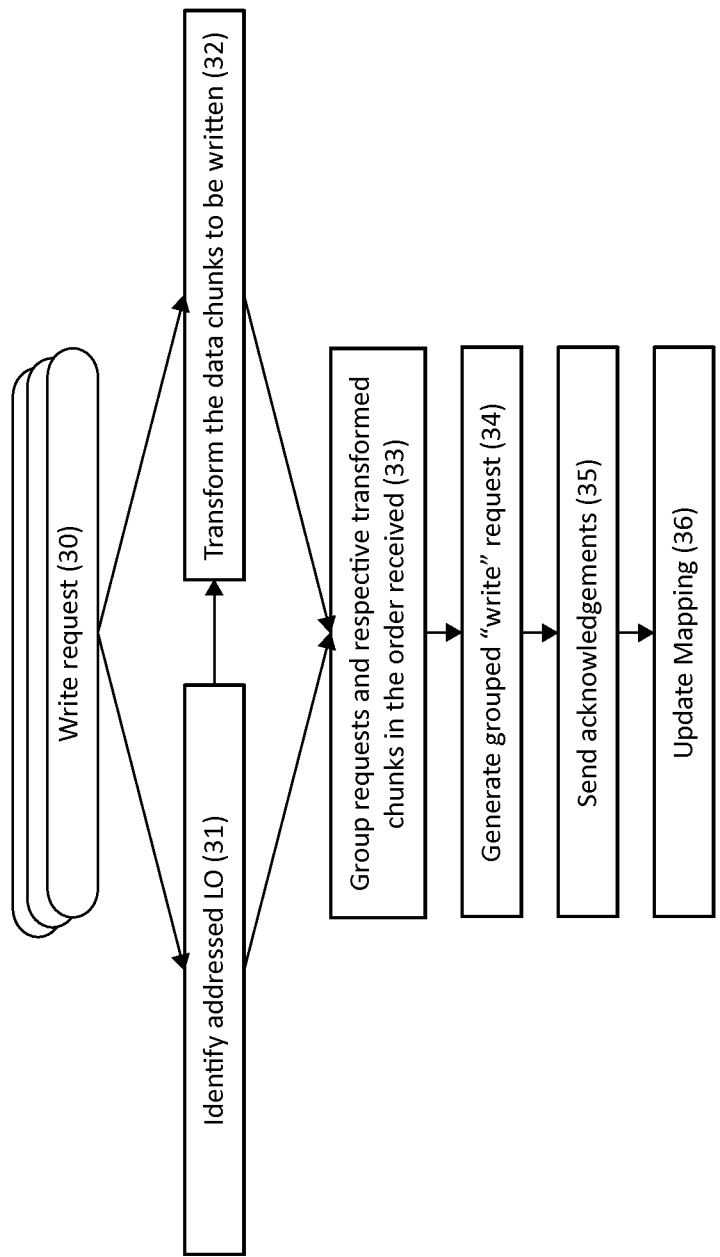
FIG. 3 illustrates a generalized flowchart of a write operation in accordance with certain embodiments of the present invention.

FIG. 3 illustrates a generalized flowchart of write operation provided to the logical data object (LO) in accordance with certain embodiments of the present invention.

The transformation system receives 30 a plurality of "write" requests, each addressed to a respective certain LO and identifying the offset in the respective LO and the range L of data to write. The "write" requests may be addressed by client(s) 11 to the storage device 13 and intercepted by the transformation system 16. Alternatively or additionally, the "write" requests may be initiated (e.g. in accordance with a predefined schedule and/or event) by the maintenance unit 17 or an external maintenance unit and addressed to the transformation system.

In accordance with certain embodiments of the invention, each transformed logical data object stored in the storage device comprises a header; the header accommodates unique identification (ID) of the transformed LO. The ID may be generated by the transformation system when creating the transformed LO. Optionally, the ID may be further modified as detailed, for example in U.S. Provisional Application No. 61/294,662 filed on Jan. 13, 2010, assigned to the assignee of the present application and incorporated hereby by reference in its entirety. The transformation system generates ID in a manner facilitating one-to-one relationship between a logical data object and respective transformed logical data object generated by the transformation system and stored in the storage device. Accordingly, ID comprised in the header of generated transformed LO characterizes also the respective logical data object. The transformation system is further configured, responsive to intercepting a request addressed to certain LO, to enable identifying respective stored transformed LO in a manner transparent to a client.

ID of the transformed LO may be generated in accordance with one or more parameters characterizing the logical data object, and selection of such parameters may depend on a storage protocol. By way of non-limiting example, ID for transformed logical data objects stored per CIFS storage protocol may be generated in accordance with time of generation, CIFS command parameters (e.g. tid, pid, uid, mid) and file name; for NFS storage protocol the ID may be generated in accordance with time of generation, NFS File-Handle, NFS FSID—FileSystemID and NFS FileID; for SCSI protocol the ID may be generated in accordance with DeviceID characterizing a respective LUN.

The transformation system examines the received "write" requests in order to recognize (31) addressed logical data objects and, accordingly, ID of respective transformed LOs. The transformation system further derives from received "write" requests data chunks obtained with the request, respective offsets and lengths; and transforms 32 (e.g. compresses, encrypts, compresses & encrypts, etc.) the obtained data chunks into transformed data chunks, each transformed data chunk corresponding to a respective received write request.

The teachings of the present invention are applicable to transformed logical data objects accommodating transformed data chunks in a log form, journal form or any other form of sequential accommodation.

In addition to the transformed data, each transformed data chunk comprises information in respect of an offset of the original data chunk within the logical data object and size of the original data chunk. By way of non-limiting example, if transformed data chunks are accommodated in a log form, such information may be held in a header of each respective log. The log header may also comprise transformation-related information (e.g. initialization vector, key ID, etc.).

Among the "write" requests received during certain period of time, there may be a plurality of requests addressed to the same LO. These "write" requests may be initiated by different clients (workstations, servers, applications, etc.) and/or as multiple "write" requests by the same client or maintenance unit. The transformation system identifies the requests addressed to the same LO, and, as will be further detailed with reference to FIG. 4, groups (33) the requests and respective transformed data chunks related to the same LO whilst keeping the transformed data chunks in the order corresponding to the order of the respective received requests.

The grouping is provided until accomplishment of certain predefined criteria (e.g. until a certain period of time has elapsed, and/or until total size of the transformed chunks in the group exceeds a predefined size, and/or until achieving a pre-defined number of grouped requests, etc.). The grouping may involve additional criteria as, for example, grouping may be provided only for multiple "write" requests obtained from a single client or predefined users (or user groups), and/or predefined applications, etc. "Write" requests initiated by clients and by the maintenance unit(s) may be grouped together or separately.

The transformation system further generates (34) grouped "write" request to the storage system for writing the resulting group of the processed data chunks to the storage. Upon writing to the storage, the grouped data chunks are sequentially accommodated in the respective transformed logical data object in accordance with the order these and previous chunks were received.

After the group of processed data chunks is written at the storage location, the transformation system receives an acknowledging response from the storage system. The request mapping module 24-2 recognizes acknowledging responses with regard to the grouped "write" request among responses received from the storage system. The logical object manager 24 further multiplies the response, and enables sending (35) respective acknowledgements to the sources of all requests in the group (e.g. workstation, workstation+application, maintenance unit, etc.) whose request has been fully accomplished.

The transformation system further provides mapping (36) of the stored data, the mapping facilitating one-to-one relationship between data derived from the received "write" requests (obtained data chunks) and data to be read from the respective stored transformed logical object.

By way of non-limiting example, the transformed logical data object (LO) may be obtained as follows:

a) in response to a respective request, creating in the storage device a transformed logical data object comprising a header and one or more allocated accommodation sections with predefined size;

b) processing one or more obtained variable size data chunks corresponding to the transforming logical data object thus giving rise to the transformed data chunks, wherein at least one of said transformed data chunks comprises transformed data resulting from said processing;

c) sequentially accommodating the transformed data chunks into said accommodation sections in accordance with an order said chunks received, and d) facilitating mapping between the data in the transforming logical data object and the data accommodated in the accommodation sections.

The accommodation sections serve as atomic elements of transformation/de-transformation operations during input/output transactions on the logical data object.

The processing may comprise one or more techniques of data transformation (e.g. compression, encryption, compression together with encryption, etc.) These techniques may be coordinated in time, may concurrently execute autonomous sets of instructions, and be provided in a manner facilitating preserving the sequence of processing and accommodating the processed data chunks.

The mapping may be provided with the help of at least one index section constituting a part of the transformed logical data object, the index section comprising at least one record holding at least information related to transformed data chunks accommodated in at least one accommodation section and indication of physical storage location pertaining to the accommodation section. The information related to the transformed data chunk may comprise, for example, offset and size in the non-transformed LO, association with the accommodation section, etc.)

Certain embodiments of the above exemplified method of generating a transformed logical data object for storage in a storage device and respective writing and reading operations are detailed in International Applications WO2007138600, WO2007138601 and WO2007138602 published Dec. 12, 2007 and assigned to the assignee of the present application.

In a case of transformed LO accommodating transformed data chunks in one or more accommodation sections (AS) as described above, the transformation system, upon generating (34) grouped "write" request, writes the group of transformed chunks to an active accommodation section (AS accommodating the last written processed data chunk). If the active accommodation section does not comprise enough free space to accommodate the grouped data chunks (e.g. writing operation fails on target buffer overflow, group size more than said free space, etc.), the transformation system requests the session manager to allocate a new accommodation section.

Optionally, if the free space in the active AS is insufficient to accommodate the entire group of chunks, but meets a predefined criteria (e.g. more than predefined size, more than predefined ratio of entire required space, etc.), the transformation system splits the group into two parts, writing one in the active AS and the second in the new AS.

If a group has been split between accommodation sections, the corresponding response is sent to the originating addresses only after the transformation system receives from the storage system acknowledgement of storing the entire group.

Mapping (36) may be provided by updating the index section. Such update may be provided substantially in parallel with acknowledgement, when allocating the new AS and/or closing the LO and/or in accordance with other predefined rules. The index section update includes adding records related to the new transformed data chunks, and corresponding updating previous records related to live and/or outdated data comprised in the corresponding range.

Figure 4:
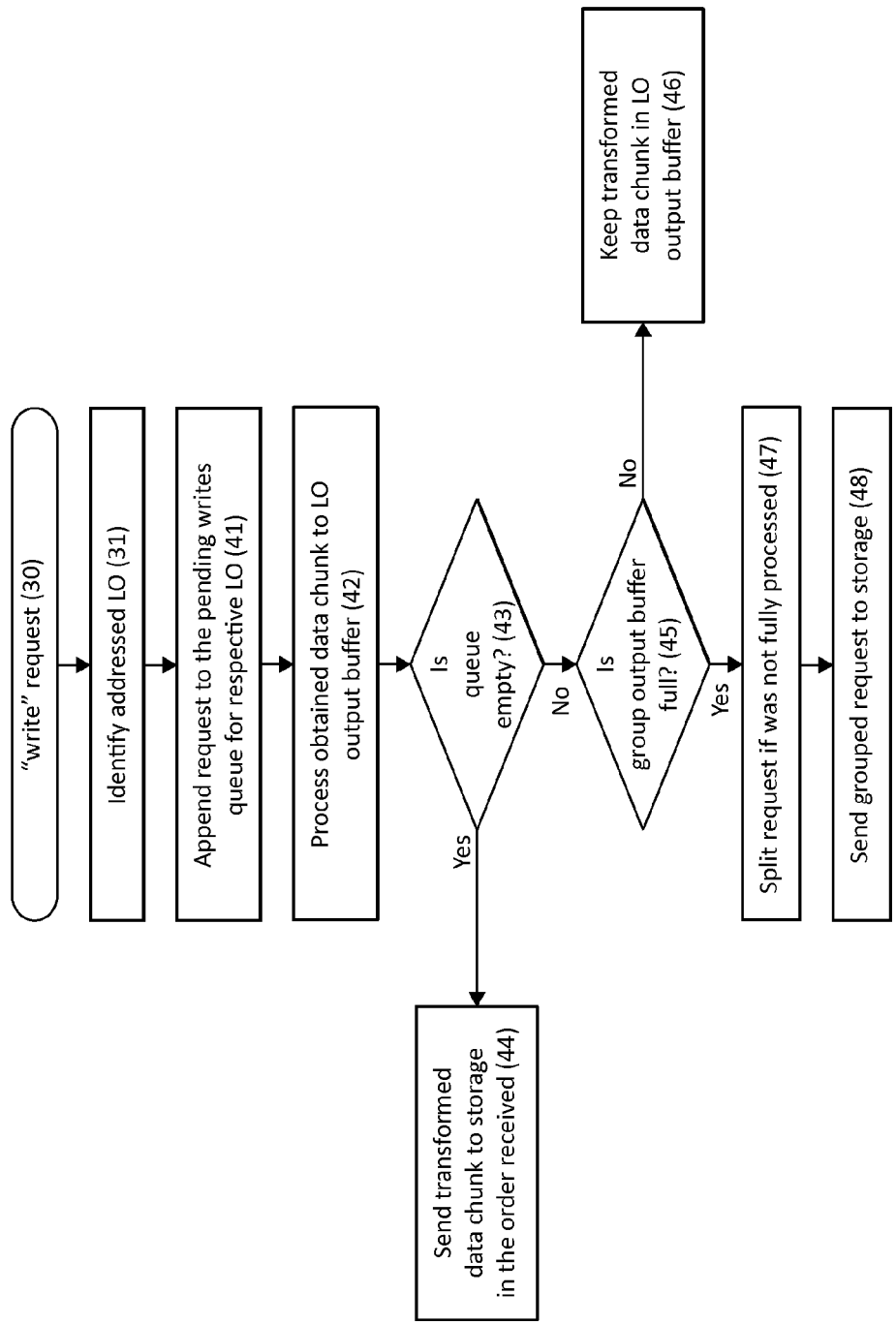
FIG. 4 illustrates a generalized flowchart of handling a write request in a write request queue in accordance with certain embodiments of the present invention.

FIG. 4 illustrates a generalized flowchart of handling a write request in a "write" request queue in accordance with certain embodiments of the present invention. Upon identifying (31) a logical data object addressed in a "write" request received from a client or a maintenance unit, the logical object manager 24 appends (41) the request to a pending "write" requests queue associated with the identified LO. The pending writes unit 24-1 is configured to open and handle the queues of pending "write" requests addressed to the same LOs. The obtained data chunk is processed (42) by the transformation unit 26 into transformed data chunk and accommodated in an output buffer associated with the identified LO. The transformation unit further updates the request mapping module 24-2 with regard to association between the transformed data chunk and respective LO. Operations 41 and 42 may be provided sequentially of in parallel.

The logical object manager further checks (43) if there are requests in the pending "write" requests queue associated with the identified LO, and if "No", facilitates (44) sending the transformed data chunk for writing in the storage device. If the queue comprises one or more requests addressed to the same identified LO, the buffer manager checks (45) the status of the output buffer associated with said LO. If the total size of transformed data chunks related to the identified LO and accommodated in the output buffer matches certain criteria (i.e. respective buffer is full), the accommodated transformed data chunks are combined in the grouped "write" request. The generated grouped "write" request is further sent (48) to the storage device. Transformed data chunks in the grouped "write" request are combined in the order corresponding to the order of the respective received requests in the queue, and, upon writing, sequentially accommodated in the transformed LO in accordance with the same order. If the "write" request (30) is not fully processed because of the full buffer, it may be appended to a new queue or, optionally, may be truncated and split (47). If the buffer is not full, the transformed data chunk is kept (46) in respective output buffer and is sent to the storage device upon accomplishment of a certain criteria (e.g. elapsed runtime, filling up the buffer with transformed data chunks corresponding to other "write" requests to the same identified LO, etc.) as a part of the respective group of transformed data chunks.

As long as there are requests in the pending writes queue associated with a given LO, they are processed by the transformation unit into the output buffer and grouped as described above.

The grouping illustrated in FIG. 4 is provided until achieving a predefined size of a respective buffer. As was detailed with reference to FIG. 3, the grouping may be provided until accomplishment of another criteria and/or combination thereof.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present invention.

It will also be understood that the system according to the invention may be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

Those skilled in the art will readily appreciate that various modifications and changes can be applied to the embodiments of the invention as hereinbefore described without departing from its scope, defined in and by the appended claims.

The invention claimed is:

1. A method for transformation of logical data objects for storage, comprising:
   transmitting, by a server via a storage network, a plurality of data chunks and a plurality of write requests to write the data chunks to a plurality of storage devices, each data chunk associated with a respective write request and each storage device comprising one or more logical data objects (LOs);
   intercepting, by a processor in a transformation system coupled to the server via the storage network such that the storage network is located between the transformation system and the server and coupled to the plurality of storage devices via the storage network such that the storage network is located between the transformation system and the plurality of storage devices, each of the plurality of data chunks and each of the plurality of write requests to write the data chunks to a storage device prior to each of the data chunks and each of the plurality of write requests reaching the storage device, each data chunk associated with a respective write request;
   receiving the plurality of data chunks and their associated write requests;
   transforming, by the processor, each data chunk;
   determining an order that each transformed data chunk was received;
   grouping each transformed data chunk in accordance with the order the transformed data chunks were received to generate a plurality of groups of transformed data chunks and respective write requests, each grouping comprising a predetermined size;
   determining if a target LO for storing a particular group of transformed data chunks in a respective storage device includes sufficient free space to accommodate the particular group of transformed data chunks;
   if the target LO includes sufficient free space to accommodate the particular group of transformed data chunks:
     transmitting the particular group of transformed data chunks and their respective write requests to the target LO, and
     writing the particular group of transformed data chunks to the target LO; and
   if the target LO includes insufficient free space to accommodate the particular group of transformed data chunks:
     determining if the particular group of transformed data chunks meets a predefined criteria related to a size of the particular group of transformed data chunks,
     if the size of the particular group of transformed data chunks meets the predefined criteria:
       allocating a new LO in the respective storage device,
       splitting the group of transformed data chunks and their associated respective write requests into a plurality of parts,
       transmitting a first part of the group of transformed data chunks and their associated respective write requests to the target LO,
       transmitting a second part of the group of transformed data chunks and their associated respective associated write requests to the new LO,
       writing the first part of the plurality of parts to the target LO, and
       writing the second part of the plurality of parts to the new LO, and
     if the size of the particular group of transformed data chunks fails to meet the predefined criteria:
       allocating the new LO,
       transmitting the group of transformed data chunks and their respective write requests to the new LO, and
       writing the particular group of transformed data chunks to the new LO.

2. The method of claim 1, further comprising:
   receiving, from the storage device, an acknowledgement with regard to each group write request;
   multiplying the received acknowledgement; and
   transmitting respective acknowledgements to each source that initiated a write request corresponding to a data chunk included within each group of transformed data chunks.

3. The method of claim 1, wherein at least a portion of the respective write requests is generated by the transformation system during one of a maintenance process and an optimization process.

4. The method of claim 1, wherein intercepting the data chunks is transparent to a client.

5. The method of claim 1, further comprising:
   identifying two or more write requests addressed to a same logical data object; and recognizing, by the processor, a unique identification of a respective transformed logical data object.

6. The method of claim 1, further comprising transmitting the transformed data chunks to one or more storage sections, wherein the one or more storage sections serve as atomic elements of transformation/de-transformation operations during input/output transactions on a transformed logical data object.

7. A system for transformation of logical data objects for storage, comprising:
   a storage network;
   a plurality of storage devices coupled to the storage network;
   a server coupled to the storage network, wherein the server transmits, via the storage network, a plurality of data chunks and a plurality of write requests to write the data chunks to the plurality of storage devices, each data chunk associated with a respective write request and each storage device comprising one or more logical data objects (LOs); and
   a transformation system coupled to the plurality of storage devices via the storage network such that the storage network is located between the transformation system and the server and coupled to the server via the storage network such that the storage network is located between the transformation system and the plurality of storage devices, the transformation system comprising a processor and memory coupled to the processor, wherein the memory is configured to store computer code that, when executed by the processor, causes the processor to:
      intercept each of the plurality of data chunks and each of the plurality of write requests prior to each of the data chunks and each of the plurality of write requests reaching the plurality of storage devices,
      receive the plurality of data chunks and their associated write requests,
      transform each data chunk,
      determine an order that each transformed data chunk was received,
      group each transformed data chunk in accordance with the order the transformed data chunks were received to generate a plurality of groups of transformed data chunks and respective write requests, each group comprising a predetermined size,
      determine if a target LO for storing a particular group of transformed data chunks in a respective storage device includes sufficient free space to accommodate the particular group of transformed data chunks;
      if the target LO includes sufficient free space to accommodate the particular group of transformed data chunks:
         transmit the particular group of transformed data chunks and their respective write requests to the target LO, and
         writing the particular group of transformed data chunks to the target LO; and
      if the target LO includes insufficient free space to accommodate the particular group of transformed data chunks:
         determining if the particular group of transformed data chunks meets a predefined criteria related to a size of the particular group of transformed data chunks,
         if the size of the particular group of transformed data chunks meets the predefined criteria:
            allocate a new LO in the respective storage device,
            split the group of transformed data chunks and their associated respective write requests into a plurality of parts,
            transmit a first part of the group of transformed data chunks and their associated respective write requests to the target LO,
            transmit a second part of the group of transformed data chunks and their associated respective associated write requests to the new LO,
            write the first part of the plurality of parts to the target LO, and
            write the second part of the plurality of parts to the new LO, and
         if the size of the particular group of transformed data chunks fails to meet the predefined criteria:
            allocate the new LO,
            transmit the group of transformed data chunks and their respective write requests to the new LO, and
            write the particular group of transformed data chunks to the new LO.

8. The system of claim 7, wherein the processor is further configured to:
   receive, from the storage device, an acknowledgement with regard to each group write request;
   multiply the received acknowledgement; and
   transmit respective acknowledgements to each source that initiated a write request corresponding to a data chunk included within each group of transformed data chunks.

9. The system of claim 7, wherein at least a portion of respective write requests is generated by the transformation system during one of a maintenance process and an optimization process.

10. The system of claim 7, wherein the processor intercepting the data chunks is transparent to a client.

11. The system of claim 7, wherein the processor is further configured to:
   identify two or more write requests addressed to a same logical data object; and
   recognize a unique identification of a respective transformed logical data object.

12. The system of claim 7, wherein the processor is further configured to transmit the transformed data chunks to one or more storage sections, wherein the one or more storage sections serve as atomic elements of transformation/de-transformation operations during input/output transactions on a transformed logical data object.

13. A computer program product comprising a storage device including a computer readable program code embodied therein for transformation of logical data objects for storage, the computer program product comprising:
   computer code for transmitting, by a server via a storage network, a plurality of data chunks and a plurality of write requests to write the data chunks to a plurality of storage devices, each data chunk associated with a respective write request and each storage device comprising one or more logical data objects (LOs);
   computer code for intercepting, by a processor in a transformation system coupled to the server via the storage network such that the storage network is located between the transformation system and the server and coupled to the plurality of storage devices via the storage network such that the storage network is located between the transformation system and the plurality of storage devices, each of the plurality of data chunks and each of the plurality of write requests prior to each of the data chunks and each of the plurality of write requests reaching the plurality of storage devices;

computer code for receiving the plurality of data chunks and their associated write requests;

computer code for transforming each data chunk;

computer code for determining an order that each transformed data chunk was received;

computer code for grouping each transformed data chunk in accordance with the order the transformed data chunks were received to generate a plurality of groups of transformed data chunks and respective write requests, each grouping comprising a predetermined size;

computer code for determining if a target LO for storing a particular group of transformed data chunks in a respective storage device includes sufficient free space to accommodate the particular group of transformed data chunks;

if the target LO includes sufficient free space to accommodate the particular group of transformed data chunks:
  computer code for transmitting the particular group of transformed data chunks and their respective write requests to the target LO, and
  computer code for writing the particular group of transformed data chunks to the target LO; and if the target LO includes insufficient free space to accommodate the particular group of transformed data chunks:
  computer code for determining if the particular group of transformed data chunks meets a predefined criteria related to a size of the particular group of transformed data chunks,
  if the size of the particular group of transformed data chunks meets the predefined criteria:
    computer code for allocating a new LO in the respective storage device,
    computer code for splitting the group of transformed data chunks and their associated respective write requests into a plurality of parts,
    computer code for transmitting a first part of the group of transformed data chunks and their associated respective write requests to the target LO,
    computer code for transmitting a second part of the group of transformed data chunks and their associated respective associated write requests to the new LO,
    computer code for writing the first part of the plurality of parts to the target LO, and
    computer code for writing the second part of the plurality of parts to the new LO, and
  if the size of the particular group of transformed data chunks fails to meet the predefined criteria:
    computer code for allocating the new LO,
    computer code for transmitting the group of transformed data chunks and their respective write requests to the new LO, and
    computer code for writing the particular group of transformed data chunks to the new LO.

14. The computer program product of claim 13, further comprising:
  computer code for receiving, from the storage device, an acknowledgement with regard to each group write request;
  computer code for multiplying the received acknowledgement; and
  computer code for transmitting respective acknowledgements to each source that initiated a write request corresponding to a data chunk included within each group of transformed data chunks.

15. The computer program product of claim 13, wherein at least a portion of the respective write requests is generated by the transformation system during one of a maintenance process and an optimization process.

16. The computer program product of claim 13, wherein the computer code for intercepting the data chunks intercepts the data chunks in a manner that is transparent to a client.

17. The computer program product of claim 13, further comprising:
  computer code for identifying two or more write requests addressed to a same logical data object; and
  computer code for recognizing, by the processor, a unique identification of a respective transformed logical data object.

18. The computer program product of claim 13, further comprising computer code for transmitting the transformed data chunks to one or more storage sections, wherein the one or more storage sections serve as atomic elements of transformation/de-transformation operations during input/output transactions on a transformed logical data object.

* * * * *